Patented Dec. 12, 1939

2,183,347

UNITED STATES PATENT OFFICE 2,183,347

PACKING MATERIAL

Julian A. Campbell, Long Beach, and Samuel C. Carter, Los Angeles, Calif.

No Drawing. Application December 21, 1936, Serial No. 117,000

1 Claim. (Cl. 106—7.5)

This invention relates to packing and relates more particularly to packing material useful in numerous situations where it is desired to provide a fluid-tight and pressure tight seal. A general object of this invention is to provide an inexpensive, practical packing material that is unaffected by and completely impervious to practically all fluids.

Another object of this invention is to provide a normally non-plastic packing material having a relatively high co-efficient of friction that is capable of distortion and flow only under very high pressures.

Another object of this invention is to provide a metallic or partially metallic packing material that may be placed under a very heavy compression force to effect a seal and that will remain in the sealing condition for an indefinite period.

Another object of this invention is to provide an improved packing material of the character mentioned that will remain in proper sealing relation and will not shrink away from the sealing faces with which it is in contact even though the actuating or sealing pressure be lessened or removed.

Another object of this invention is to provide packing material of the character mentioned that is insoluble in most fluids and substantially unaffected by the temperature conditions that may be encountered in most installations.

Another object of this invention is to provide a packing material of the character mentioned that contains a large proportion of metal so that it, in effect, constitutes a metal seal or gasket between the sealing faces of the valve parts or machine parts.

Another object of this invention is to provide packing material of the character mentioned that is simple and inexpensive to manufacture and that is convenient to handle and install.

The improved packing material provided by the present invention has a wide range of application, being adapted for use in a great many situations and under various conditions. We will herein describe a typical preferred form of the invention adapted for use in valves of the character fully described and claimed in our co-pending application entitled "Valve", Serial No. 83,480, filed May 25, 1936, now Patent Number 2,091,671, and for use in similar situations. It is to be understood that the present invention is not to be construed as limited or restricted to the specific details about to be set forth or to any specific use or application.

The packing material provided by this invention is a metallic or partially metallic material comprising a relatively large proportion of metal, a substantial proportion of graphite, a softening or mixing agent, and a binder.

The metal ingredient of the packing material is preferably a relatively soft and deformable metal such as lead, brass, copper, aluminum, white metal, or the like. The particular kind of metal employed in the packing material depends, to some extent, upon the use or application of the material. For example, for most purposes it has been found practical to employ lead as the principal ingredient of the packing material. Where the packing is to be subjected to a very high temperature it may be preferred to employ a metal having a higher melting point than lead, for example, it may be preferred to employ cobalt, tellurium, brass, copper, aluminum or the like, as the metal ingredient. In other instances where the packing material is to be subjected to the action of acids it may be preferred to employ graphite and lead with cobalt or tellurium or cobalt or tellurium with or without lead. In accordance with the invention the base material, whether it be lead, cobalt, tellurium, brass, copper, aluminum, white metal, or the like, is embodied in the material in two different states or forms. About forty percent of the packing material is in the form of metal shot of a relatively small diameter. For example, forty percent (40%) of the material may be in the form of lead, cobalt, brass, copper, aluminum, or white metal shot of about thirty-two thousandths (.0032) of an inch in diameter. This metal shot is flattened or rolled into the form of discs or flakes of between five to ten thousandths of an inch in thickness. The metal discs or flakes in addition to giving the packing material "body" acts as a binder and materially adds to the coefficient of friction of the material and makes the material non-uniform in texture.

In addition to the above described metal discs or flakes the packing material includes metal in the form of comminuted or ground metal. The ground metal employed is preferably of about one hundred (100) mesh. When the packing material is to be employed in typical installations it has been found practical to employ ground lead as the fine metal constituent or ingredient of the material. However, where the packing material is to be employed in situations where it may be subjected to very high temperatures it may be preferred to employ ground cobalt, ground tellurium, ground brass, ground copper, ground aluminum, ground white metal or the like, instead of the ground lead. It has been found desirable to employ approximately forty percent (40%) of a ground metal of the nature just described.

The graphite is embodied in the packing material to render it partially plastic and to give the material the desired lubricating properties. It is preferred to employ graphite in the proportion of approximately twenty percent (20%). The graphite may be in a ground or comminuted state and is preferably a good grade of graphite. It will be observed that the metal in the form of flakes and in a ground state, and the graphite comprising the principal ingredients of the material, are substantially unaffected by most fluids and temperature conditions encountered in practically all installations.

A relatively small quantity of a suitable oil is preferably incorporated in the packing material to soften the mix and to facilitate the making of a proper dough. In practice, practically any desired mineral, vegetable or animal oil may be employed, the character of the small quantity of oil used being of little consequence. The material also includes a binder to assist in retaining the metal discs, metal particles and the graphite in intimate contact and relation. It has been found desirable to employ powdered rosin as the binder. While the proportion of binder employed may be varied considerably it has been found desirable to employ between 35 and 45 ounces of powdered rosin to each 108 pounds of mix of the above-described ground and flaked metal and graphite.

In preparing the packing material of the invention the metal shot is preferably flattened or made into disc or flake form prior to incorporating it with the other materials. The flaked metal, the powdered metal, the graphite, the oil and the rosin are all mixed together simultaneously. The material may be mixed in any suitable form of mixer or agitator to effect a uniform distribution of the several ingredients. In practice it has been found desirable to mix the material in a barrel. If desired or found necessary the mix may be subjected to heat during the mixing process. The ground metal, the flaked metal, the graphite, the oil and the binder are thoroughly mixed to produce a material in which the several ingredients are uniformly distributed.

Following the mixing operation the packing material is broken up into relatively small pieces and is then pressed into the desired shape. It is to be understood that the material may be pressed into any desired shape for marketing and for installation in various valves and devices. For use in valves of the character referred to above it has been found practical to press the packing material into the form of pellets or relatively small cylindrical sticks. The material may be pressed into the desired shape in a ram or cylinder and piston press capable of exerting a relatively high compression force on the material. The packing material may be readily packaged, marketed and handled when pressed into suitable relatively small sticks or pellets of the desired shape. It is preferred to subject the packing material to a comparatively heavy compression force to give it the desired pellet or stick form, to render it more compact, and to lessen the amount of compression it must be subjected to when installed in the packing position in the valve or device.

The packing material of the present invention is inexpensive to manufacture and is easy and convenient to handle and employ. It has been found that the packing material is practically impervious to and impenetrable by practically all fluids. As described above, where certain conditions are encountered the metal ingredients of the material may be changed to adapt the packing for the particular installation. The packing material is normally rigid or non-plastic and is only rendered plastic by subjecting it to very heavy super-atmospheric pressures. When subjected to such high pressures the packing material may be made to flow into tight sealing contact with the adjacent sealing surfaces. When forced into such sealing contact with the sealing surfaces the packing material will indefinitely remain in the sealing relation or condition. The fluid under pressure being sealed against or excluded by the packing material therefore cannot dislodge or loosen the material. Further, being insoluble in and impervious to most fluids the packing material does not wash away, dissolve or become saturated with the fluid handled. The material is in the nature of a solid body or mass when under pressure, as distinguished from oils, greases and the like which remain liquid or partially liquid even when subjected to high super-atmospheric pressures.

Having a high metal content the packing material in effect constitutes a metallic sealing element or gasket between the sealing faces and, in effect, constitutes a mechanical element of the valve or device in which it is employed. The metal in disc or flake form distributed throughout the mix of the packing material gives the material a relatively high co-efficient of friction and makes the material non-uniform in texture whereby it may conform to and flow about flanges, shoulders, edges, etc., of valves and machine parts. The packing material will remain in proper sealing contact with the sealing faces of a valve or the like for an indefinite period, even though the sealing or compression forces on the packing material may be lessened or removed. A body or packing material of the present invention employed in a valve or the like, may be added to from time to time by properly inserting pellets or sticks of the packing material and subjecting them to compression strains. Such packing material added to the main body of packing material joins the main body to form a continuous uniform part thereof. The packing material is very convenient to install and to store, ship, etc.

Having described only a typical preferred form and application of our invention, we do not wish to be limited or restricted to the specific details herein set forth, but wish to reserve to ourselves any variations or modifications that may appear to those skilled in the art or fall within the scope of the following claim.

Having described our invention, we claim:

Packing material of the character described including, approximately forty percent (40%) flattened lead shot, approximately forty percent (40%) ground lead, approximately twenty percent (20%) ground graphite, rosin and oil.

SAMUEL C. CARTER.
JULIAN A. CAMPBELL.